(12) United States Patent
Berger et al.

(10) Patent No.: US 7,871,945 B2
(45) Date of Patent: Jan. 18, 2011

(54) WOVEN WEBBING

(75) Inventors: Johann Berger, Obers Schlossstr. 114, 73553 Alfdorf (DE); Murat Celik, Heubach (DE)

(73) Assignee: Johann Berger, Aldorf (DE)

( * ) Notice: Subject to any disclaimer, the term of this patent is extended or adjusted under 35 U.S.C. 154(b) by 0 days.

(21) Appl. No.: 11/385,249

(22) Filed: Mar. 21, 2006

(65) Prior Publication Data

US 2006/0246801 A1    Nov. 2, 2006

Related U.S. Application Data

(63) Continuation of application No. PCT/EP2004/010752, filed on Sep. 24, 2004.

(30) Foreign Application Priority Data

Sep. 24, 2003   (DE)   ................... 103 44 334

(51) Int. Cl.
*D03D 15/00*   (2006.01)
(52) U.S. Cl. .................. 442/203; 442/182; 442/208; 442/209; 442/228; 442/229
(58) Field of Classification Search .............. 442/182, 442/203, 208, 209, 228, 229; 139/421
See application file for complete search history.

(56) References Cited

U.S. PATENT DOCUMENTS

| | | | |
|---|---|---|---|
| 4,004,616 A | | 1/1977 | Andronov et al. |
| 4,274,895 A | * | 6/1981 | Bascou et al. ............. 156/53 |
| 4,982,780 A | * | 1/1991 | Stepanenko et al. ........ 164/463 |
| 5,927,060 A | * | 7/1999 | Watson ................. 57/210 |
| 6,211,793 B1 | * | 4/2001 | Smithson ............... 340/665 |
| 6,224,094 B1 | * | 5/2001 | Norton ................. 280/735 |
| 6,572,148 B2 | * | 6/2003 | Wittenberg ............. 280/808 |
| 6,581,960 B1 | * | 6/2003 | Schondorf et al. ........ 280/735 |
| 6,866,068 B2 | | 3/2005 | Berger et al. |
| 6,918,410 B1 | | 7/2005 | Berger |
| 2002/0037755 A1 | | 3/2002 | Rodemer et al. |
| 2003/0166367 A1 | | 9/2003 | Berger et al. |
| 2004/0182468 A1 | | 9/2004 | Trondel et al. |
| 2005/0161919 A1 | | 7/2005 | Berger et al. |
| 2006/0016546 A1 | | 1/2006 | Berger |

FOREIGN PATENT DOCUMENTS

| | | |
|---|---|---|
| DE | 2508728 | 9/1976 |
| DE | 20017823 U | 12/2000 |
| DE | 10205937 A | 8/2002 |
| DE | 10209695 A | 9/2002 |
| WO | WO 2004106120 A1 * | 12/2004 |

OTHER PUBLICATIONS

PCT/EPO Search Report for PCT/EP2004/010752 (dated: Dec. 17, 2004).

* cited by examiner

*Primary Examiner*—Andrew T Piziali
(74) *Attorney, Agent, or Firm*—Harness, Dickey & Pierce, P.L.C.

(57) ABSTRACT

Disclosed is a woven strap, particularly for safety belts in motor vehicles, which is characterized in that said woven strap comprises a first group of warp threads and a second group of warp threads, the warp threads of the first group being provided with a greater elongation than the warp threads of the second group.

19 Claims, 2 Drawing Sheets

WOVEN WEBBING

CROSS-REFERENCE TO RELATED APPLICATIONS

This application is a continuation of PCT patent application serial no. PCT/EP2004/010752, filed on Sep. 24, 2004, which claims priority to German patent application serial no. 103 44 334.7, filed on Sep. 24, 2003, both of which are incorporated by reference herein.

BACKGROUND AND SUMMARY

The invention relates to a woven webbing, particularly for automotive seat belts.

Woven webbing, also for use in automotive seat belts, is known from a wealth of publications and practical examples. In certain cases items are attached to one or more points of the webbing, whereby depending on how the items are attached this could result in the material of the webbing being weakened, thus resulting in the specified tensile strength of the webbing possibly no longer being satisfied over the full width in the scope as demanded. Such items are, for instance, retainer buttons for preventing movement, for example of a buckle, beyond the point of attachment. In addition, there are, for example, also microphones for automotive hands-off telephone systems which are attached to seat belts at one or more points. It is in this arrangement that the attachment damages threads, particularly warp threads, of the webbing to such an extent that the tensile strength of the webbing is reduced.

An object of the invention is to propose a woven webbing, particularly for automotive seat belts which is suitable for the attachment of applications in the run of the woven webbing, as well as such seat belt themselves in avoiding or at least greatly reducing the disadvantages known from prior art. This object is achieved with a woven webbing as it reads from claim 1. The first group of warp threads having a higher extensibility is provided to advantage in a portion in which application items are to be attached. Because of the higher extensibility of the corresponding warp threads any weakening and thus reduction in the tensile strength of the warp threads caused by the application items is now compensated such that both groups of warp threads feature the necessary tensile strength when the webbing is stressed. In this arrangement, the difference in the extensibility of the warp threads of the first group and the warp threads of the second group is selected to advantage so that when exposed to tensile stress all threads counter the tensile force uniformly. If, for instance, laser welding an application item, e.g. a microphone, to the woven webbing in accordance with the invention results in a weakening of the warp threads of the first group, this weakening now has no effect on proper functioning of the woven webbing, since the selected high extensibility of the warp threads of the first group compensates any weakening of the tensile strength.

In one advantageous further embodiment of the invention the woven webbing comprises warp threads of a third group comprising electrically conductive means. This now makes it possible to power electric devices attached at some location to the woven webbing in the sense of the warp threads of the first group; these electric devices may be, for example, microphones, sensors, controllers, and the like. In another advantageous further embodiment of the invention the warp threads of the first group comprise electrically conductive means in thus endowing the warp threads having a higher extensibility with a second function, namely the conduction of electricity. This combination of enhanced extensibility and conduction of electricity simplifies the structure of the woven webbing in accordance with the invention as a whole. In yet another advantageous further embodiment of the invention the electrically conductive means are electrically insulated at their surface. Now, the electrically conductive means can be routed very close together because of the individual insulation of the warp threads instead of having to rely on insulation due to a spacing even with electrically conductive warp threads spaced as viewed in the weft direction. It has been discovered to advantage that varnish coating the electrically conductive means can now be produced very cost-effectively and reliably in even attaining a color-matched varnish coating.

In a particularly advantageous further embodiment of the invention the woven webbing is configured so that the electrically conductive means are wound by the warp threads. This design of the warp threads wound with electrically conductive means has major advantages, especially in contraction and/or stretching of the woven webbing. The electrically conductive means spirally wound around the warp threads in accordance with the invention, for example, conducting wire with a rectangular cross-section complies with the lengthwise movements of the warp threads in their longitudinal direction without themselves being exposed to any appreciable tensile strength possibly tearing the electrically conductive means out of place. The pitch in the windings can be advantageously tailored to the particularly application concerned.

In one advantageous alternative in configuring the electrically conductive means arranged at the warp threads of the first group or third group it is now attained that a finely curled wire is arranged as the electrically conductive means within warp threads forming a staple common fiber. This design of the electrically conductive means also permits compensating contraction and/or stretching without ruining the electrically conductivity. In still another advantageous further embodiment the warp threads comprising electrically conductive means are "concealed" so-to-speak in the interior of the woven webbing. This has the major advantage that the electrically conductive means are now no longer visible whilst, on the other hand, being protected from wear and corrosion. In one additional advantageous further embodiment of the woven webbing in accordance with the invention one or more electrically device(s), especially microphone(s), sensor(s), controller(s) is/are applied to one or more locations in the region of the warp threads. This now makes it possible to apply an electrical device expediently for the application concerned at any location in the longitudinal run of the woven webbing; for example, a microphone for a hands-off telephone system, for a telephone or dictaphone, or a device for monitoring the health of the vehicle occupant such as pulse, temperature etc., or a lighting fixture or a loudspeaker. Further advantages and features read from the sub-claims.

BRIEF DESCRIPTION OF DRAWINGS

For a better appreciation of the invention it will now be detailed by way of an example with reference to the drawings in which.

DETAILED DESCRIPTION

Figure 1:
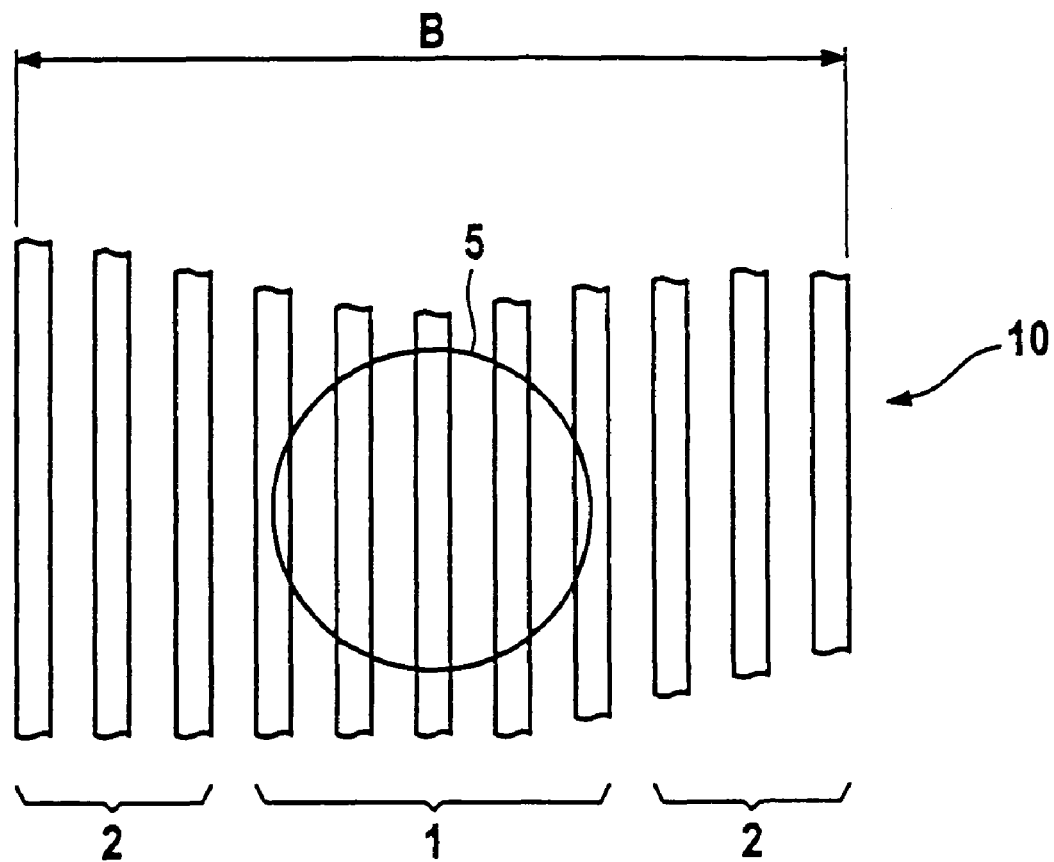
FIG. 1 is a plan view of a woven webbing in accordance with the invention shown simplified diagrammatically and on a greatly magnified scale.

Referring now to FIG. 1 there is illustrated in a view simplified diagrammatically a webbing 10 having a width B, warp threads 2 of a certain extensibility running over the outer portions—in a number which as shown has merely been selected to be symbolic—whereas in the middle portion, selected in this case just as an example, warp threads 1 of greater extensibility than the warp threads 2 run. The very short portion of a webbing 10 in accordance with the invention shown in FIG. 1 has in this case a very broad middle portion, selected just as an example, in which warp threads 1 having a higher extensibility run. It will be appreciated that this illustration is shown exaggerated for the sake of clarity. In reality, such a webbing contains hundreds of warp threads over the width B of the webbing very much finer than the warp threads 1 and warp threads 2 as shown in FIG. 1. Merely for orientation of a device to be applied thereto is a circle identified by the reference numeral 5 shown in the middle of the webbing 10, this being, of course, just a qualitative indication.

Figure 2:
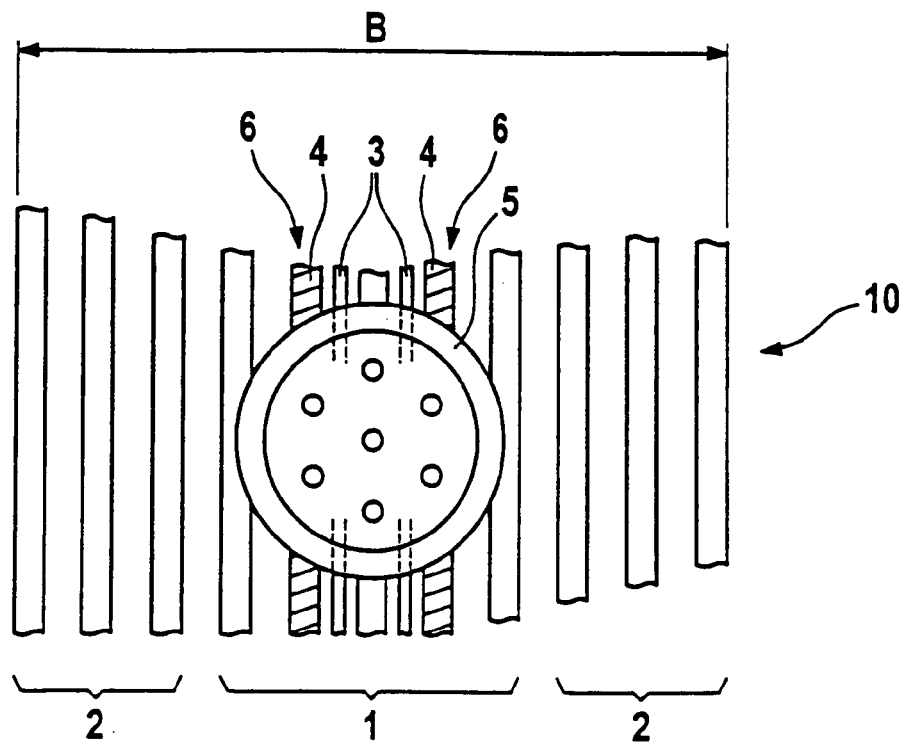
FIG. 2 is the same view of the woven webbing as shown in FIG. 1, showing warp threads but with a microphone attached.

Referring now to FIG. 2 there is illustrated the webbing 10 as already shown in FIG. 1, now, however, a microphone 5 being symbolically evident in the middle in the region of the warp threads 1 of high extensibility. The microphone 5 is connected via warp threads 6 belonging to the group of warp threads 1 but incorporating electrically conductive means 4. Shown as an example are two warp threads 6 having the same extensibility as the warp threads 1 but additionally provided with electrically conductive means 4, details of which are given in the following. As an alternative the microphone 5 shown as an example in FIG. 2 can be powered via warp threads 3 shown additionally inserted between the warp threads 1. This is intended to indicate how the warp threads 3 may likewise include electrically conductive means—not highlighted in this case—but not necessarily having cross-sections and parameters other than those of warp threads 1.

Figure 3:
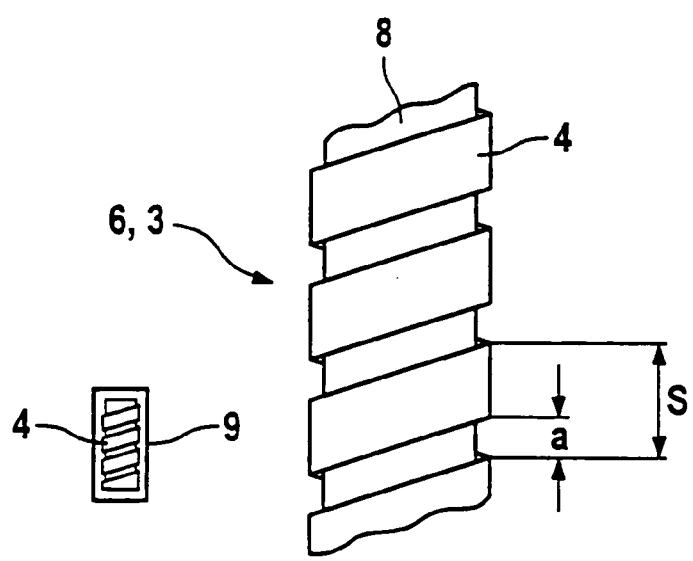
FIG. 3 is a view of a warp thread wound with a electrically conductive means on a greatly magnified scale.

Referring now to FIG. 3 there is illustrated on a greatly magnified scale a warp thread 3 or 6, the latter belonging to the group of warp threads 1. The structure of the warp thread as shown in FIG. 3 as a short discontinued portion is illustrated just as a qualitative indication. A warp thread core 8 is provided with a rectangular cross-section—see the diagrammatic illustration to the left of the warp threads 6, 3 in FIG. 3—the core 8 possibly being made of PET, for example, whereas the electrically conductive means 4 is selected from a favorable electrically conductive alloy.

In an additional advantage aspect as shown in FIG. 3 on the left the electrically conductive means 4 is provided with an insulation 9 consisting of varnish, for example. Here too, the dimensions are roughly drawn merely qualitatively. The windings of the electrically conductive means 4, as shown in FIG. 3, have a pitch S, resulting in a spacing a between the individual windings in conjunction with the width of the electrically conductive means 4 configured as a band. Depending on whether the webbing in accordance with the invention is extended or contracted as intended after or during weaving, a larger pitch S is selected when contracted, a smaller pitch S when extended resulting in the spacing a being set so that no buckling or rupture of the electrically conductive means 4 can materialize.

In viewing the FIGs. as described above, the person skilled in the art will, of course, immediately appreciate that the weft threads of the webbing 10 in accordance with the invention are not shown for the sake of a better overview. But, of course, in reality the actual appearance of a webbing is often such that the warp threads determine the appearance of a webbing, since the weft threads usually are not at all evident. Contrary to how they are shown in FIG. 2, the warp threads with the electrically conductive means illustrated diagrammatically therein are actually embodied concealed in the interior of the webbing so that they are, for one thing, concealed from view and, for another, are protected from damage from without. In the example aspect as described in this case, warp threads 2 in each case are shown with electrically conductive means. In reality, however, considerably more such warp threads may be provided depending on the nature and quantity of the electrical signals to be conducted.

The conductors achieved by the warp threads with electrically conductive means are thus brought out to the surface as desired only in defined regions for electrically connecting the corresponding electrical devices, for example, to which, for instance, by means of laser welding a cap or housing of an electrical device, for example of a microphone, can be applied. However, as already emphasized repeatedly, configuring the woven webbing in accordance with the invention achieves a uniform tensile strength of the warp threads over the width of the finished webbing. It is also to be noted that it is possible to apply a device to the surface of the webbing in accordance with the invention not just on one side but on both sides.

The automotive seat belt in accordance with the invention with the electrically conductive warp threads included in the weave is suitable moreover with the application of the corresponding devices for monitoring medical data of a vehicle occupant such as, for example, pulse, blood pressure, temperature, etc. Apart from this, it is of advantage for out-of-position-technology since it permits sensing the current position or posture of a vehicle occupant as to physique, weight, etc and even in tailoring the development of an air bag in the vehicle interior to the current situation in case of a collision.

Yet another possibility is an additional function with the webbing in accordance with the invention in namely checking its proper functioning so as to, for example, signal the need for replacement/renewal in due time due to wear and tear.

The invention claimed is:

1. A woven webbing for an automotive seat belt comprising:
    a first group of nonconductive warp threads having a first extensibility; and
    a second group of nonconductive warp threads having a second extensibility, the first extensibility being greater than the second extensibility;
    wherein at least one warp thread of the first group of warp threads includes an electrical conductor concealed in an interior of the woven webbing that electrically connects with an electronic device that is ultrasonic or laser welded to the first group of warp threads; and
    wherein the greater extensibility of the first group of warp threads compensates for any weakening of tensile strength due to the welding of the electronic device, such that when the first and second groups of warp threads are exposed to tensile stress all of the threads therein counter the tensile force substantially uniformly.

2. The woven webbing as set forth in claim 1, wherein the electrical conductor is electrically insulated on its surface.

3. The woven webbing as set forth in claim 1, wherein the electrical conductor is varnished on its surface.

4. The woven webbing of claim 1, wherein the first group of warp threads are arranged on a middle portion of the woven webbing that is laterally offset from end portions of the woven webbing that comprises the second group of warp threads.

5. The woven webbing of claim 1, wherein the electronic device includes a controller.

6. The woven webbing of claim 1, wherein one of: (a) the electrical conductor and (b) the nonconductive warp threads, is wound around a circumference of the other in a spiral manner having a smaller pitch when the seat belt is extended and a larger pitch then contracted.

7. The woven webbing of claim 1, wherein the electronic device is laser welded to the first group of warp threads.

8. The woven webbing of claim 1, wherein the electronic device is a microphone.

9. The woven webbing of claim 1, wherein the nonconductive warp threads include a PET portion.

10. A woven seat belt webbing comprising:
a first group of warp threads having a first extensibility;
a second group of warp threads having a second extensibility, the first extensibility being greater than the second extensibility;
at least one electrically conductive warp thread, including an outer insulator, being concealed in an interior of the woven webbing; and
an electrical device attached to the electrically conductive warp thread;
the warp threads having a substantially uniform tensile strength over the width of the finished seat belt webbing.

11. The woven seat belt webbing of claim 10, wherein the electrical device is connected to the conductive warp thread and operably senses at least one of: (a) an occupant body function, and (b) an occupant position.

12. The woven seat belt webbing of claim 10, wherein at least one of the first and second groups of warp threads has a substantially rectangular cross-section made from PET.

13. The woven seat belt webbing as set forth in claim 10, wherein the electrical device includes a microphone welded to the electrically conductive warp thread.

14. The woven seat belt webbing as set forth in claim 13, wherein the microphone includes a housing welded to the electrically conductive warp thread.

15. The woven seat belt webbing of claim 10, wherein the electrical device includes a sensor.

16. The woven seat belt webbing of claim 10, wherein the insulator is a varnish.

17. The woven seat belt webbing of claim 10, wherein the electrical device includes a microphone.

18. The woven seat belt webbing of claim 10, wherein the electrical device includes a controller.

19. The woven seat belt webbing of claim 10, wherein at least one of the warp threads in the first and second groups include a PET portion.

* * * * *